Nov. 20, 1923. 1,475,044
O. G. BLOOM
SHOCK ABSORBER
Filed June 23, 1922  2 Sheets-Sheet 2
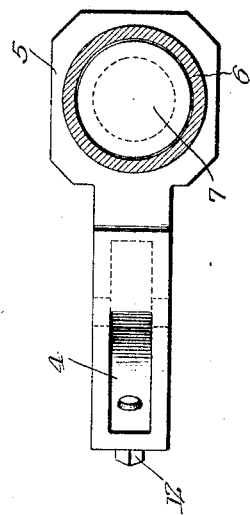
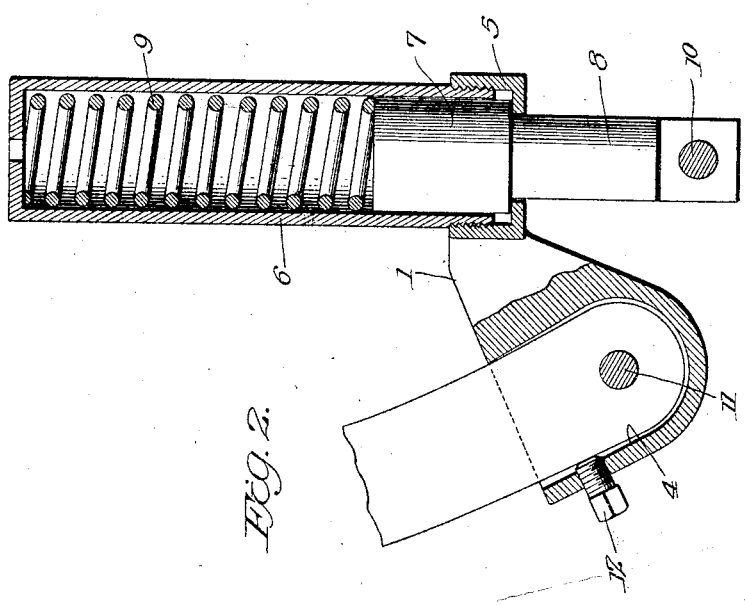
O. G. Bloom
INVENTOR
Victor J. Evans
ATTORNEY Patented Nov. 20, 1923.

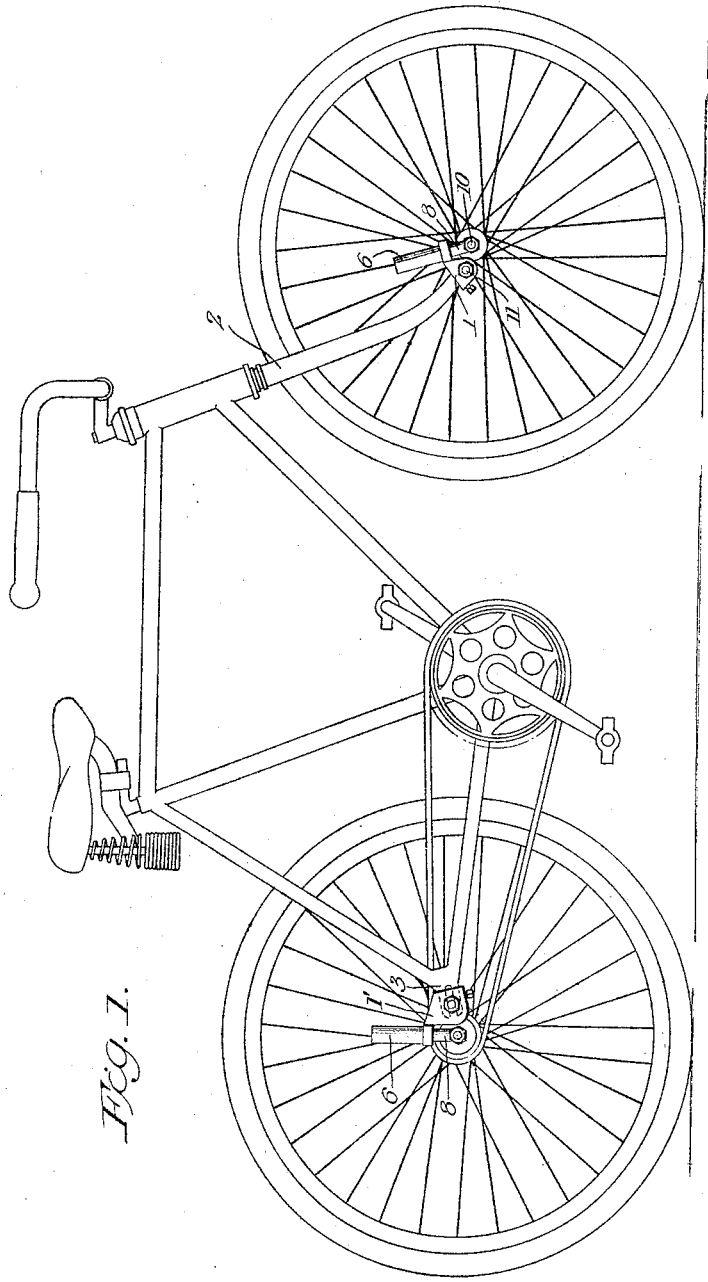

1,475,044

UNITED STATES PATENT OFFICE.

OTTIS GRANT BLOOM, OF WILKES-BARRE, PENNSYLVANIA.

SHOCK ABSORBER.

Application filed June 23, 1922. Serial No. 570,295.

*To all whom it may concern:*

Be it known that I, OTTIS GRANT BLOOM, a citizen of the United States, residing at Wilkes-Barre, in the county of Luzerne and State of Pennsylvania, have invented new and useful Improvements in Shock Absorbers, of which the following is a specification.

This invention relates to shock absorbers for bicycles and the like, the general object of the invention being to provide shock absorbing means which may be attached to a bicycle as now constructed by simply passing the wheel shafts through the shock absorbing means and connecting such means to the bicycle frame by bolts which pass through the openings in the frame made to receive the wheel shafts.

Another object of the invention is to provide means for clamping the shock absorbing means to parts of the bicycle frame so that the parts are held in position by such clamping means in addition to the bolts.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a bicycle showing my invention in use.

Figure 2 is an enlarged sectional detail view of the absorber for the front wheel.

Figure 3 is a plan view of one of the absorbers.

As shown in these views I provide two pairs of supporting members one pair 1 being connected with the prongs of the steering post 2 of the bicycle and the other pair 1' being connected with the fork prongs 3 at the rear of the frame of the bicycle, the rear pair being slightly different from the front pair. Each support is provided with an elongated inclined socket 4 for receiving a fork prong and with a cup-shaped part 5 for receiving the end of the cylinder 6, the cup and cylinder being preferably threaded together. A piston 7 is located in each cylinder and each piston has a shank 8 passing through a hole in the bottom of the cup-shaped member and the piston is normally held in its lowest position by the coil spring 9 which is located in the cylinder. The lower end of the shank 8 is flattened and provided with a hole to receive the shaft 10 which passes through the wheel hub. The support 1 is held to the prong by means of a bolt 11 which passes through holes in the socket walls of the support and through the hole in the prong through which the wheel shaft formerly passed. The support is also secured to the prong by means of the set screw 12 which passes through the support and engages the prong to clamp the same in the socket.

The supports 1' for the rear wheel have the sockets made large enough to receive the fork prongs 3 and this socket is placed in a different position from the socket in the front support, as will be seen from Figure 1.

As will be understood an absorber device is placed at each end of each of the wheel shafts so that the shaft is held against upward movement by the springs of the absorber. These springs will act to absorb all shocks and will prevent such shocks being communicated to the rider.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A shock absorber of the character described comprising a support having a reduced end and provided with an elongated inclined socket formed therein to receive a forked prong of a bicycle, an interiorly threaded cup shaped part formed on the reduced end of the support and being provided with an open bottom, a cylinder threadedly secured in the cup shaped part and rising therefrom, a piston arranged for reciprocation in the cylinder and normally engaging the cup shaped part, a shank depending from the piston and passing through the open bottom of the cup shaped part, a coil spring having its end convolutions engaging the top of the cylinder and piston respectively, and an apertured flattened end formed on the shank adapted to receive the bicycle axle, as and for the purpose specified.

In testimony whereof I affix my signature.

OTTIS GRANT BLOOM.